(12) United States Patent
Newman

(10) Patent No.: US 7,546,473 B2
(45) Date of Patent: Jun. 9, 2009

(54) DIMMER HAVING A MICROPROCESSOR-CONTROLLED POWER SUPPLY

(75) Inventor: Robert C Newman, Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 280 days.

(21) Appl. No.: 11/480,146

(22) Filed: Jun. 30, 2006

(65) Prior Publication Data

US 2007/0001654 A1 Jan. 4, 2007

Related U.S. Application Data

(60) Provisional application No. 60/695,784, filed on Jun. 30, 2005.

(51) Int. Cl.
*G06F 1/26* (2006.01)
*G06F 1/32* (2006.01)

(52) U.S. Cl. .................... 713/300; 713/320; 713/340; 323/208; 323/233; 323/905

(58) Field of Classification Search ............... 713/300, 713/320, 340; 323/208, 233, 905
See application file for complete search history.

(56) References Cited

U.S. PATENT DOCUMENTS

| | | | |
|---|---|---|---|
| 4,415,894 A | | 11/1983 | Dressler et al. |
| 4,689,547 A | | 8/1987 | Rowen et al. |
| 4,745,351 A | | 5/1988 | Rowen et al. |
| 5,017,837 A | | 5/1991 | Hanna et al. |
| 5,248,919 A | * | 9/1993 | Hanna et al. ............... 315/291 |
| 5,440,441 A | | 8/1995 | Ahuja |
| 5,638,540 A | * | 6/1997 | Aldous ...................... 713/300 |
| 5,905,442 A | * | 5/1999 | Mosebrook et al. .......... 340/3.7 |
| 6,137,272 A | | 10/2000 | Chalupa et al. |
| 6,262,565 B1 | | 7/2001 | Williams et al. |
| 6,300,727 B1 | * | 10/2001 | Bryde et al. ................ 315/294 |
| 6,348,798 B1 | * | 2/2002 | Daw ........................ 324/426 |
| 6,380,692 B1 | | 4/2002 | Newman et al. |

(Continued)

OTHER PUBLICATIONS

International Search Report mailed Sep. 14, 2007 in corresponding International Application No. PCT/US06/25662.

*Primary Examiner*—Thomas Lee
*Assistant Examiner*—Michael J Brown
(74) *Attorney, Agent, or Firm*—Ostrolenk, Faber, Gerb & Soffen, LLP

(57) ABSTRACT

A power supply for a two-wire load control device supplies power to a microprocessor, which in turn controls the power supply. The power supply comprises an energy storage element, e.g., a capacitor, for producing a DC voltage for powering the microprocessor. The power supply comprises a high impedance circuit for allowing the energy storage element to receive energy at a first rate before the DC voltage is produced and the microprocessor is powered. The power supply further comprises a low-impedance circuit, i.e., a resistor in series electrical connection with a controllably conductive device, for allowing the energy storage element to receive energy at a second rate greater than the first rate. After starting up, the microprocessor is operable to selectively enable and disable the second energy-receiving circuit by rendering the controllably conductive device conductive and non-conductive, respectively. The microprocessor is operable to monitor the power supply and to control the amount of power delivered to an electrical load connected to the load control device in response to the monitoring of the power supply.

44 Claims, 11 Drawing Sheets

U.S. PATENT DOCUMENTS

| | | |
|---|---|---|
| 6,674,248 B2 | 1/2004 | Newman, Jr. et al. |
| 6,969,959 B2 | 11/2005 | Black et al. |
| 6,980,122 B2 | 12/2005 | Novikov |
| 6,987,449 B2 | 1/2006 | Novikov |
| 7,012,518 B2 | 3/2006 | Novikov |
| 7,091,672 B2 * | 8/2006 | Steffie et al. ................ 315/282 |
| 7,190,124 B2 | 3/2007 | Kumar et al. |
| 7,242,150 B2 | 7/2007 | DeJonge et al. |
| 7,285,919 B2 | 10/2007 | Newman, Jr. et al. |
| 7,423,413 B2 | 9/2008 | Dobbins et al. |
| 7,432,661 B2 | 10/2008 | Taipale et al. |
| 2006/0230293 A1 * | 10/2006 | Veselic ....................... 713/300 |
| 2007/0159153 A1 | 7/2007 | Fricke et al. |

* cited by examiner

DIMMER HAVING A MICROPROCESSOR-CONTROLLED POWER SUPPLY

RELATED APPLICATIONS

This application claims priority from commonly-assigned U.S. Provisional Patent Application Ser. No. 60/695,784, filed Jun. 30, 2005, entitled DIMMER HAVING A MICROPROCESSOR-CONTROLLED POWER SUPPLY, the entire disclosure of which is hereby incorporated by reference.

BACKGROUND OF THE INVENTION

1. Field of the Invention

The present invention relates to a two-wire load control device, specifically a two-wire smart dimmer having a microprocessor and a power supply for generating a direct-current (DC) voltage for powering the microprocessor.

2. Description of the Related Art

A conventional two-wire dimmer has two connections: a "hot" connection to an alternating-current (AC) power supply and a "dimmed hot" connection to the lighting load. Standard dimmers use one or more semiconductor switches, such as triacs or field effect transistors (FETs), to control the current delivered to the lighting load and thus to control the intensity of the light. The semiconductor switches are typically coupled between the hot and dimmed hot connections of the dimmer.

Smart wall-mounted dimmers may include a user interface typically having a plurality of buttons for receiving inputs from a user and a plurality of status indicators for providing feedback to the user. These smart dimmers typically include a microprocessor or other processing device for allowing an advanced set of control features and feedback options to the end user. An example of a smart dimmer is disclosed in commonly assigned U.S. Pat. No. 5,248,919, issued on Sep. 28, 1993, entitled LIGHTING CONTROL DEVICE, which is herein incorporated by reference in its entirety.

A simplified block diagram of a prior art two-wire dimmer 100 is shown in FIG. 1. The dimmer 100 has a hot terminal 102 connected to an AC voltage source 104 and a dimmed hot terminal 106 connected to a lighting load 108. The dimmer 100 employs a semiconductor switch 110 coupled between the hot terminal 102 and the dimmed hot terminal 106, to control the current through, and thus the intensity of, the lighting load 108. The semiconductor switch 110 has a control input (or gate), which is connected to a gate drive circuit 112. The input to the gate will render the semiconductor switch 110 conductive or non-conductive, which in turn controls the power supplied to the lighting load 108. The gate drive circuit 112 provides control inputs to the semiconductor switch 110 in response to command signals from a microprocessor 114.

The microprocessor 114 receives user inputs from a plurality of buttons 116 and generates command signals to drive a plurality of light emitting diodes (LEDs) 118 for visual feedback to the user of the dimmer 100. A zero-crossing detect circuit 120 determines the zero-crossing points of the AC source voltage from the AC power supply 104. A zero-crossing is defined as the time at which the AC supply voltage transitions from positive to negative polarity, or from negative to positive polarity, at the beginning of each half-cycle. The zero-crossing information is provided as an input to the microprocessor 114. The microprocessor 114 generates the gate control signals to operate the semiconductor switch 110 to thus provide voltage from the AC power supply 104 to the lighting load 108 at predetermined times relative to the zero-crossing points of the AC waveform.

In order to provide a DC voltage $V_{CC}$ to power the microprocessor 114 and other low-voltage circuitry, the dimmer 100 includes a cat-ear power supply 122. A cat-ear power supply draws current only near the zero-crossings of the AC source voltage and derives its name from the shape of the current waveform that it draws from the AC voltage source. Because the dimmer 100 only has two terminals 102, 106 (i.e., it is a two-wire dimmer), the power supply 122 must draw current through the connected lighting load 108. In order for the power supply 122 to be able to draw sufficient current, the semiconductor switch 110 must be non-conductive so that a sufficient voltage is available across the power supply. Thus, the semiconductor 110 cannot be turned on for the entire length of a half-cycle, even when the maximum voltage across the lighting load 108 is desired.

A simplified schematic diagram of the prior art cat-ear power supply 122 is shown in FIG. 2. The cat-ear power supply is provided on the DC-side of a bridge rectifier comprising diodes D202, D204, D206, D208, such that the cat-ear power supply is able to generate the DC voltage $V_{CC}$. The DC voltage $V_{CC}$ is produced across an energy storage capacitor C210 and has a magnitude that is appropriate to power the microprocessor 114 and other low-voltage circuitry (e.g., approximately $5V_{DC}$). The side of the energy storage capacitor C210 that is connected to circuit common (i.e., the cathode) is also connected to an NPN transistor Q212 and a PNP transistor Q214. A zener diode Z216 and a diode D218 are provided in series between the DC voltage $V_{CC}$ and the base of the transistor Q214. The forward voltage drop of the diode D218 is approximately the same as the emitter-base voltage of the transistor Q214. Accordingly, the magnitude of the DC voltage $V_{CC}$ produced across the energy storage capacitor C210 is limited to approximately the same magnitude as the break-over voltage of the zener diode Z216, e.g., 5.1 volts.

The primary charging or energy-receiving circuit for the energy storage capacitor C210 is through the transistor Q212 and a current limiting resistor R220. When transistor Q214 is conductive, a voltage is produced across a resistor R222, and thus the base-emitter junction of the transistor Q212, causing the transistor Q212 to conduct. A resistor R224 maintains the base current needed to keep the transistor Q214 conductive.

When the voltage across the power supply 122 reaches a certain magnitude, a PNP transistor Q226 begins to conduct, causing the transistor Q214, and thus the transistor Q212, to stop conducting. A zener diode Z228 and a resistor R230 are connected in series between the base of the transistor Q226 and the emitter of the transistor Q212. A resistor R232 is connected across the base-emitter junction of the transistor Q226. The zener diode Z228 will begin to conduct when the voltage at the base of the transistor Q226 exceeds the breakover voltage of the zener diode (approximately 12V). When the voltage across the resistor R232 exceeds the required emitter-base voltage of the transistor Q226, the transistor Q226 will begin to conduct. Thus, when an appropriate voltage (e.g., approximately 16V) is produced across the power supply 122, the transistor Q226 will begin to conduct, causing the transistors Q212, Q214 to stop conducting, thus halting the charging of the energy storage capacitor C210. A capacitor C234 is coupled across the resistor R232 to provide a time delay in the shut-off of the charging of the energy storage capacitor C210. When the voltage across the power supply 122 drops below the appropriate level (e.g., approximately 16V), the transistor Q226 stops conducting and the energy storage capacitor C210 is able to charge again.

The prior art cat-ear power supply 122 has some disadvantages. First, the period of time that the energy storage capacitor C210 is able to charge each half-cycle is set by the values of the chosen components of the power supply 122. If the power supply 122 is connected to an AC voltage source when the capacitor C210 is uncharged, the power supply is susceptible to drawing the initial charging current at the peak of the AC voltage, which can produce a very large current in the charging circuit of the power supply 122, especially through the transistor Q212 and the resistor R220. To prevent these parts from being damaged under this condition, the transistor Q212 and resistor R220 must be physically larger, more costly parts than would be required if only operating under normal conditions.

To ensure that the power supply 122 is able to draw enough current to maintain its output voltage at all times, the semiconductor switch 110 is turned off for at least a minimum off-time each half-cycle. The proper operation of the dimmer 100 is constrained by a number of worst-case operating conditions, such as high current draw by the low-voltage circuitry, worst-case line voltage input (i.e. when the AC power supply voltage is lower than normal), and worst-case load conditions (such as the number and the wattage of the lamps, the type of the lamps, and variations in the operating characteristics of the lamps). The wattage of the lighting load 108 is particularly important since the AC voltage source 104 is coupled across the power supply 122 and the lighting load in series, and thus, the impedance of the lighting load directly affects the voltage developed across the power supply and the time required to charge the power supply. The impedance of a lighting load will decrease as the rated wattage is increased, and vice versa. Thus, the worst-case time required to charge the power supply 122 occurs when a low-wattage lamp is connected to the dimmer 100 since the impedance of the load will be substantially higher and the voltage across the power supply will be substantially lower with this type of load. When considering the worst-case conditions, 40 W lamps are often used as the minimum load likely to be encountered.

By considering these worst-case conditions, the minimum off-time is determined by calculating the off-time that will guarantee that the power supply 122 will charge fully for even the worst-case conditions. The resulting off-time generally ends up being a significant portion of each half-cycle and constrains the maximum light level of the attached lighting load 108. However, these worst-case conditions are often not encountered in practice. Under typical conditions, the semiconductor switch could be rendered conductive for a greater amount of time during each half-cycle in order to conduct current to the load for a greater amount of time. Accordingly, the lighting load 108 will reach a higher intensity that is closer to the intensity achieved when the full line voltage is provided to the load.

Some prior art dimmers have held the minimum off-time constant under all conditions, and thus have suffered from a smaller dimming range than would otherwise be possible. Another prior art two-wire dimmer 300, which is shown in FIG. 3, monitors the internal power supply and decreases conduction time of the semiconductor switch, if needed. The two-wire dimmer 300 is able to provide the maximum possible light intensity at high-end while simultaneously ensuring sufficient charging time for proper operation of an internal power supply, and hence, the dimmer. The dimmer 300 is described in greater detail in co-pending U.S. patent application Ser. No. 11/127,864, filed May 12, 2005, entitled DIMMER HAVING A POWER SUPPLY MONITORING CIRCUIT, which is incorporated herein by reference in its entirety.

Referring to FIG. 3, the two-wire dimmer 300 has two connections: a hot terminal 302 to an AC power supply 304 and a dimmed hot terminal 306 to a lighting load 308. To control the AC voltage delivered to the lighting load 308, two field-effect transistors (FETs) 310A, 310B are provided in anti-serial connection between the hot terminal 302 and the dimmed hot terminal 306. The first FET 310A conducts during the positive half-cycle of the AC waveform and the second FET 310B conducts during the negative half-cycle of the AC waveform. The conduction state of the FETs 310A, 310B is determined by a microprocessor 314 that interfaces to the FETs through a gate drive circuit 312. The dimmer 300 also includes a plurality of buttons 316 for input from a user and a plurality of LEDs 318 for visual feedback to the user. The microprocessor 314 determines the appropriate dimming level of the lighting load 308 from the inputs from the buttons 316. A zero-crossing detect circuit 320 receives the AC supply voltage through diode 321A in the positive half-cycles and through diode 321B in the negative half-cycles and provides a control signal to the microprocessor 314 that identifies the zero-crossings of the AC supply voltage.

The dimmer 300 further includes a power supply 322 to power the microprocessor 314 and the other low-voltage circuitry. The power supply 322 is only able to charge when the FETs 310A, 310B are both turned off (i.e., they are non-conducting) and there is a sufficient voltage potential across the dimmer. The power supply 322 is coupled to an input capacitor 324 and an output capacitor 326. The output capacitor 326 holds the output of the power supply $V_{CC}$ at a substantially constant DC voltage to provide power for the microprocessor 314. The input of the power supply 322 is coupled to the hot terminal 302 and the dimmed hot terminal 306 through the two diodes 321A, 321B, such that the input capacitor 324 charges during both the positive and negative half-cycles.

The dimmer 300 also includes a voltage divider that comprises two resistors 328, 330 and is coupled between the input of the power supply 322 and circuit common. The voltage divider produces a sense voltage $V_S$ at the junction of the two resistors 328, 330. The sense voltage $V_S$ is provided to the microprocessor 314 to monitor the voltage level at the input of the power supply 322. The microprocessor 314 preferably includes an analog-to-digital converter (ADC) for sampling the value of the sense voltage $V_S$. The microprocessor 314 monitors the sense voltage $V_S$ and decreases the conduction times of the FETs 310A, 310B when the sense voltage $V_S$ drops below a first predetermined voltage threshold $V_1$. Further, the microprocessor 314 increases the conduction times of the FETs 310A, 310B when the sense voltage then rises above a second predetermined voltage threshold $V_2$, greater than the first threshold $V_1$. Alternatively, if the microprocessor does not include an ADC, the dimmer 100 could include a hardware comparison circuit, including one or more comparator integrated circuits, to compare the sense voltage with the first and second voltage thresholds and then provide a logic signal to the microprocessor 314.

By monitoring the input of the power supply 322, the microprocessor 314 of the dimmer 300 is able to determine when the input voltage has dropped to a level that is inappropriate for continued charging of the input capacitor 324. For example, if the sense voltage $V_S$ falls below the first voltage threshold $V_1$, then the capacitor 324 needs a greater time to properly charge and the on-times of the FETs 310A, 310B are decreased. On the other hand, if the sense voltage $V_S$ remains above the first voltage threshold $V_1$, the input capacitor 324 is able to properly charge each half-cycle.

Thus, the microprocessor 314 continuously monitors the voltage on the input capacitor 324 and automatically decreases the conduction times of the FETs 310A, 310B when the voltage falls to a level that will not guarantee proper operation of the power supply 322. The dimmer 300 is able to provide the maximum possible conduction times of the FETs 310A, 310B at high end (i.e., maximum light intensity) while simultaneously ensuring sufficient charging time for proper operation of the power supply 322.

However, the dimmer 300 of FIG. 3 requires that the microprocessor 314 include an ADC or that a hardware comparison circuit be included between the power supply 322 and the microprocessor. Also, the dimmer 300 is not able to control the power supply 322 directly, but operates the FETs 310A, 310B in order to indirectly control the time during which the power supply draws current.

Thus, there exists a need for a simple cat-ear power supply for a dimmer that is operable to be monitored and directly controlled by a microprocessor, specifically to control the time period that the power supply draws current and to control the conduction time of the semiconductor switch in response to the operation of the power supply, without the need for an ADC or a complex hardware comparison circuit.

SUMMARY OF THE INVENTION

According to the present invention, a two-wire load control device for control of the amount of power delivered to an electrical load from a source of AC voltage comprises a first controllably conductive device, a microprocessor, and a power supply. The controllably conductive device is adapted to be operatively coupled to the source of AC voltage and to the electrical load for controlling the power delivered to the load. The microprocessor is coupled to the controllably conductive device and controls the first controllably conductive device. The power supply is adapted to be coupled to the source of AC voltage and is coupled to the microprocessor. The power supply generates a DC voltage for controllably conductive device for selectively storing energy in an energy storage element. The microprocessor is operable to control the controllably conductive device.

According to another embodiment of the present invention, a two-wire load control device, for control of a load from a source of AC voltage, comprises a controllably conductive device, a power supply, and a controller. The controllably conductive device is adapted to be coupled in series electrical connection between the load and the source of AC voltage. The power supply comprises a controllable impedance coupled in series electrical connection with an energy storage element. The power supply is operable to provide a DC voltage to the energy storage element, which is operable to receive energy when the controllably conductive device is non-conductive. The controller is powered by the DC voltage of the power supply and coupled to the first controllably conductive device and the controllable impedance for control of the first controllably conductive device and the controllable impedance, respectively. The controller is operable to control the controllable impedance to a first impedance value to cause the energy storage element to receive energy at a first rate and to control the controllable impedance to a second impedance value to cause the energy storage element to receive energy at a second rate. The second impedance value is substantially smaller than the first impedance value.

According to another aspect of the present invention, a two-wire load control device, for control of a load from a source of AC voltage, comprises a controllably conductive device adapted to be coupled in series electrical connection between the load and the source of AC voltage. The load control device further comprises a power supply having an energy storage element, a first energy-receiving circuit for the energy storage element, and a second energy-receiving circuit for the energy storage element. The first energy-receiving charging circuit allows the energy storage element to receive energy at a first rate. The second energy-receiving circuit allows the energy storage element to receive energy at a second rate greater than the first rate. The power supply, which produces a DC voltage, is operable to store energy in the energy storage element when the controllably conductive device is non-conductive. The load control device further comprises a controller powered by the DC voltage of the power supply. The controller is operable to control the controllably conductive device and is coupled to the power supply to selectively enable and disable the second energy-receiving circuit.

In addition, the present invention provides a power supply for a two-wire load control device for controlling a load from a source of AC voltage. The power supply comprises an energy storage element operable to produce a DC voltage for powering a controller of the load control device, a first energy-receiving circuit for allowing the energy storage element to receive energy at a first rate, and a second energy-receiving circuit for allowing the energy storage element to receive energy at a second rate greater than the first rate. The controller is powered by the DC voltage and is operable to control the power supply to selectively enable and disable the second energy-receiving circuit.

The present invention further provides a method for generating a DC voltage in a two-wire load control device. The method comprising the steps of generating the DC voltage across an energy storage element, providing the DC voltage to a controller of the load control device, and selectively allowing the energy storage element to receive energy at a first rate and at a second rate greater than the first rate in response to the controller.

Other features and advantages of the present invention will become apparent from the following description of the invention that refers to the accompanying drawings.

DETAILED DESCRIPTION OF THE INVENTION

Figure 1:
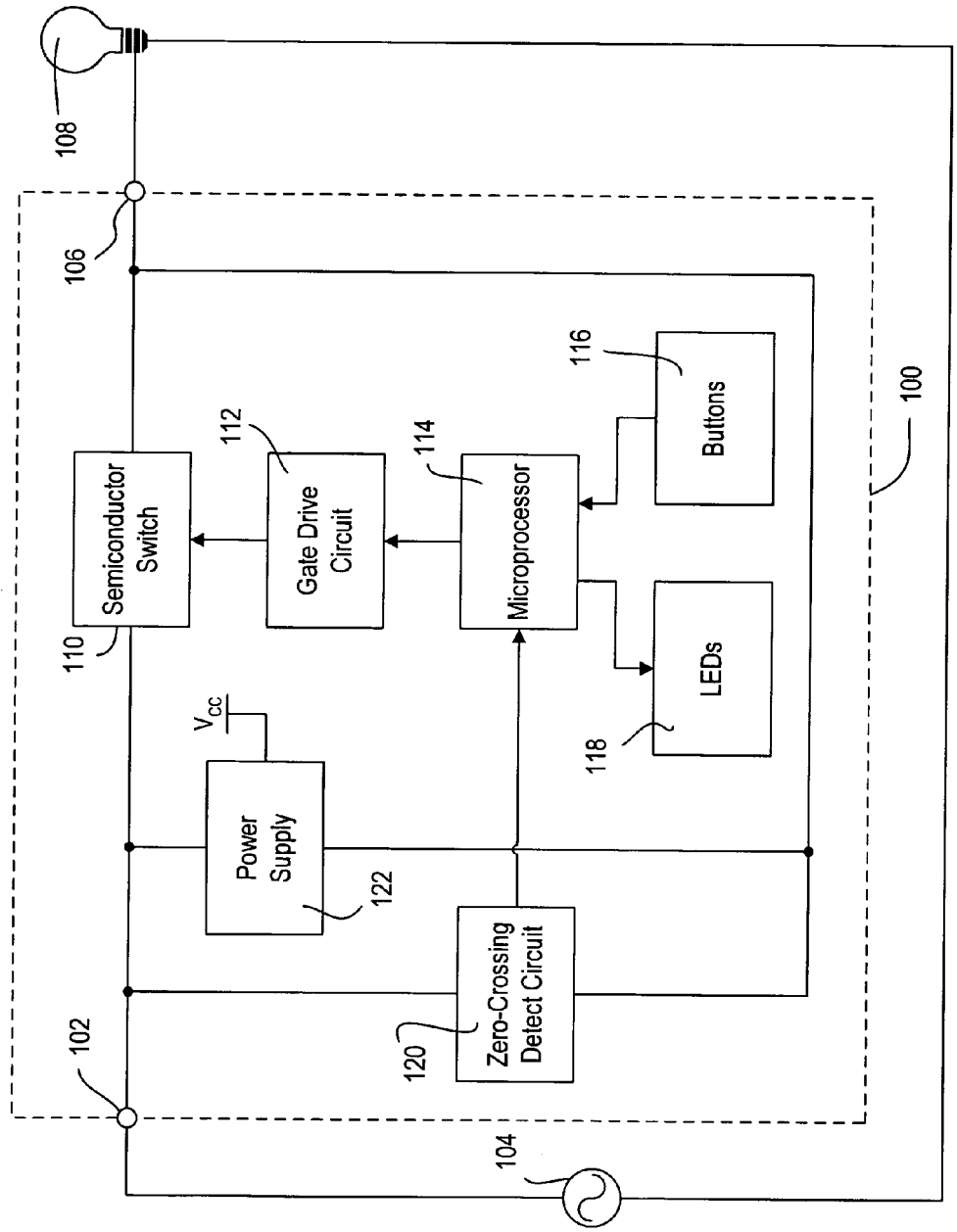
FIG. 1 is a simplified block diagram of a prior art two-wire dimmer.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 4:
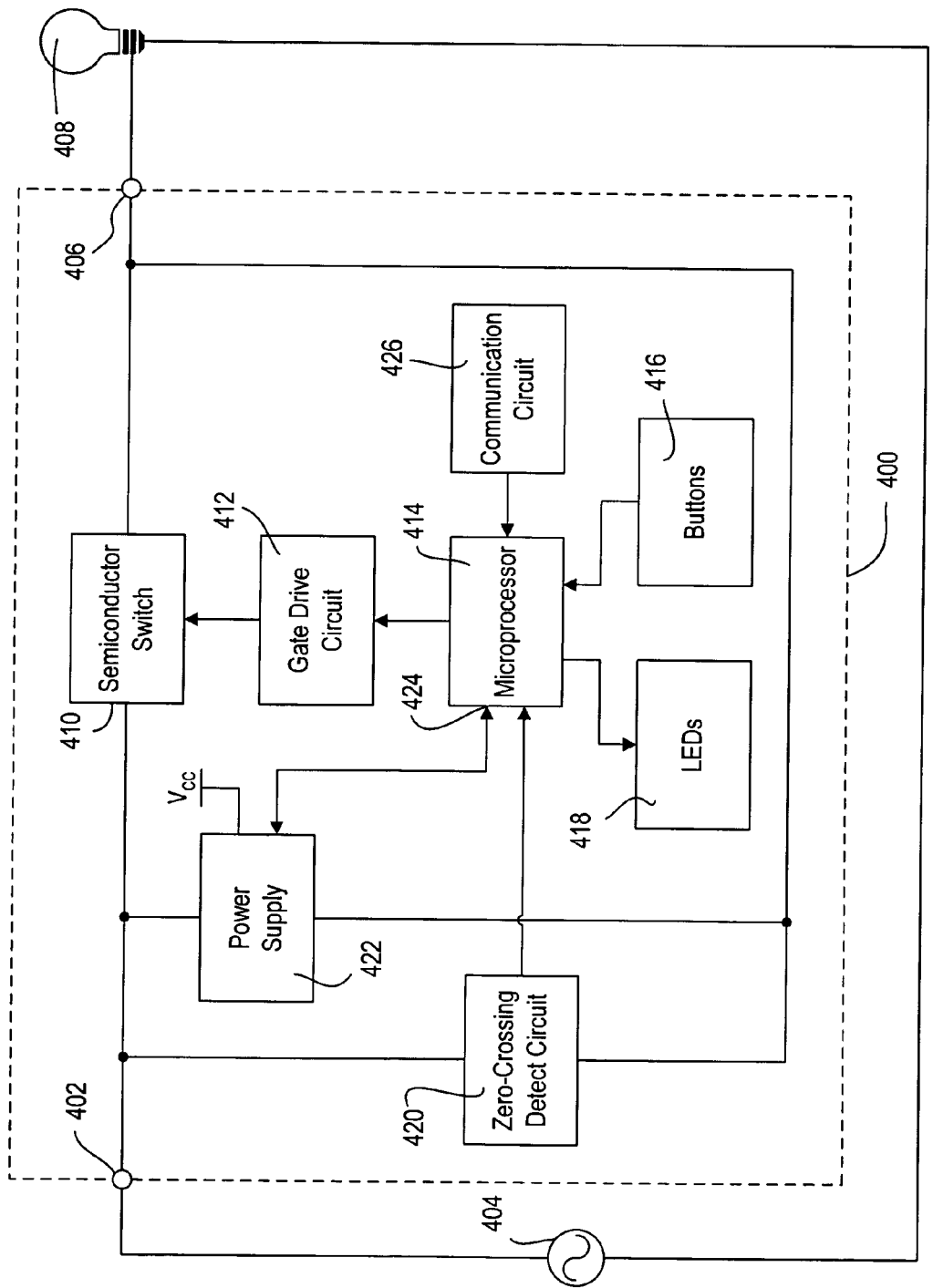
FIG. 4 is a simplified block diagram of a two-wire dimmer according to the present invention.

FIG. 4 is a simplified block diagram of a two-wire dimmer 400 according to the present invention. The dimmer 400 includes many similar blocks as the dimmer 100 of FIG. 1, which have the same function as described previously. However, those components of the dimmer 400 that differ from the prior art dimmer 100 will be described in greater detail below.

The dimmer 400 includes a microprocessor 414 for driving a controllably conductive device, preferably a semiconductor switch 410, via a gate drive circuit 412. The microprocessor 414 may be any suitable controller, such as a programmable logic device (PLD), a microcontroller, or an application specific integrated circuit (ASIC). The semiconductor switch 410 may be a triac, a field effect transistor (FET) or an insulated gate bipolar transistor (IGBT) in a bridge rectifier, two FETs or IGBTs in anti-series connection, or any other suitable type of semiconductor switch. The microprocessor receives inputs from a zero-crossing detector 420 and a plurality of buttons 416 and controls a plurality of LEDs 418. A cat-ear power supply 422 generates a DC voltage $V_{CC}$ for powering the microprocessor 414. The microprocessor 414 is coupled to the cat-ear power supply through a port 424 and is operable to monitor the status of the power supply (i.e., whether the power supply is fully charged) and to control the operation of the power supply.

The dimmer 400 also includes a communication circuit 426 to transmit and receive messages with other control devices in a lighting control system. The communication circuit 426 is coupled to a communications link, for example, a wired serial control link, a power-line carrier (PLC) communication link, or a wireless communication link, such as an infrared (IR) or a radio frequency (RF) communication link. An example of an IR lighting control system is described in commonly assigned U.S. Pat. No. 6,300,727, issued Oct. 9, 2001, entitled LIGHTING CONTROL WITH WIRELESS REMOTE CONTROL AND PROGRAMMABILITY. An example of an RF lighting control system is described in commonly assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS. The entire disclosures of the above two patents are incorporated herein by reference in their entirety.

Figure 5A:
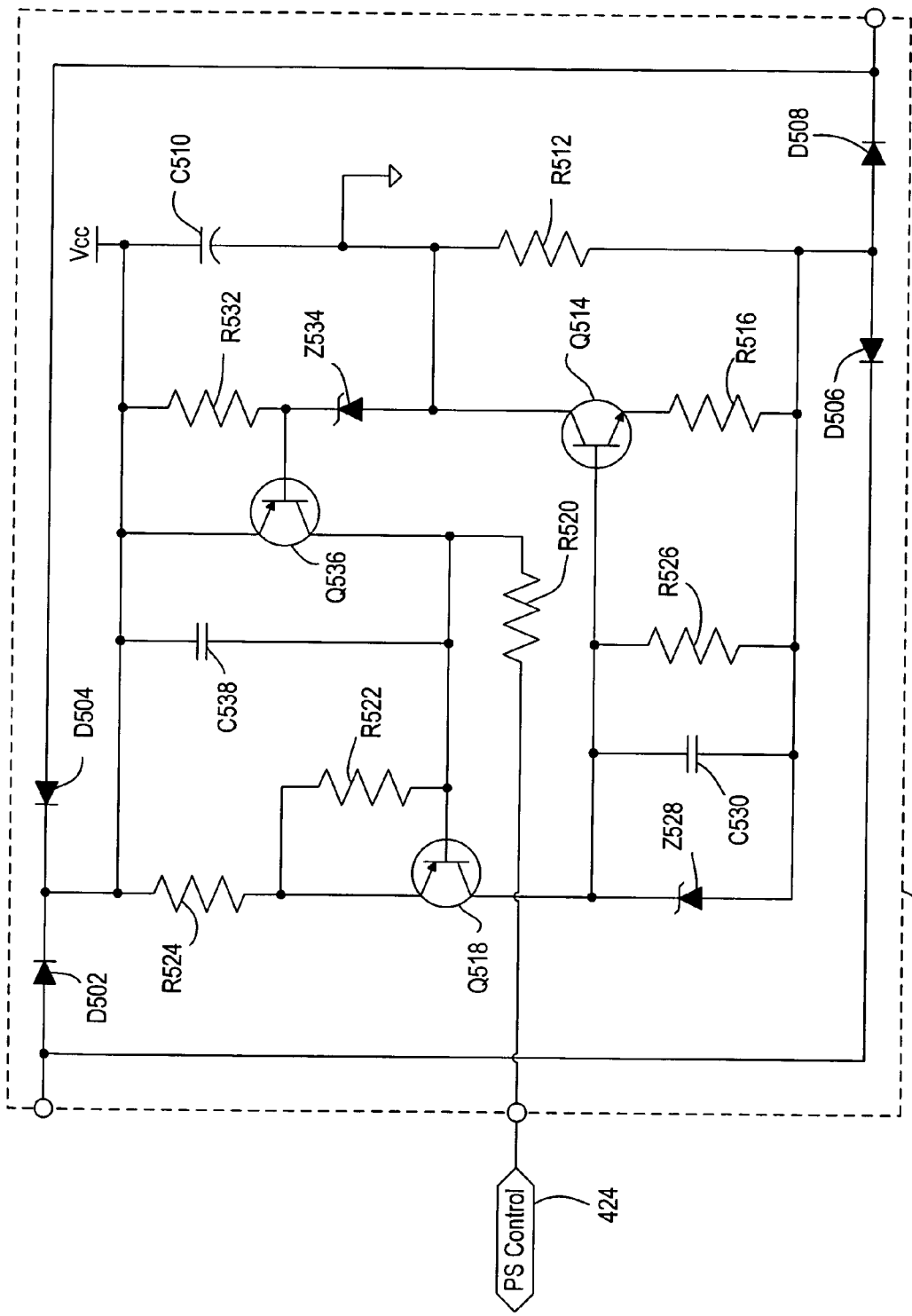
FIG. 5A is a simplified schematic diagram of a cat-ear power supply according to the present invention.

FIG. 5A is a simplified schematic diagram of the cat-ear power supply 422 according to the present invention. The cat-ear power supply 422 is provided inside of a full-wave bridge rectifier comprising diodes D502, D504, D506, D508, such that the cat-ear power supply is able to produce a DC voltage $V_{CC}$ across an energy storage element, for example, an energy storage capacitor C510. The rectifier bridge allows the cat-ear power supply 422 to draw current in both half-cycles of the AC source voltage. The energy storage capacitor preferably has a capacitance of approximately 680 μF.

Figure 5B:
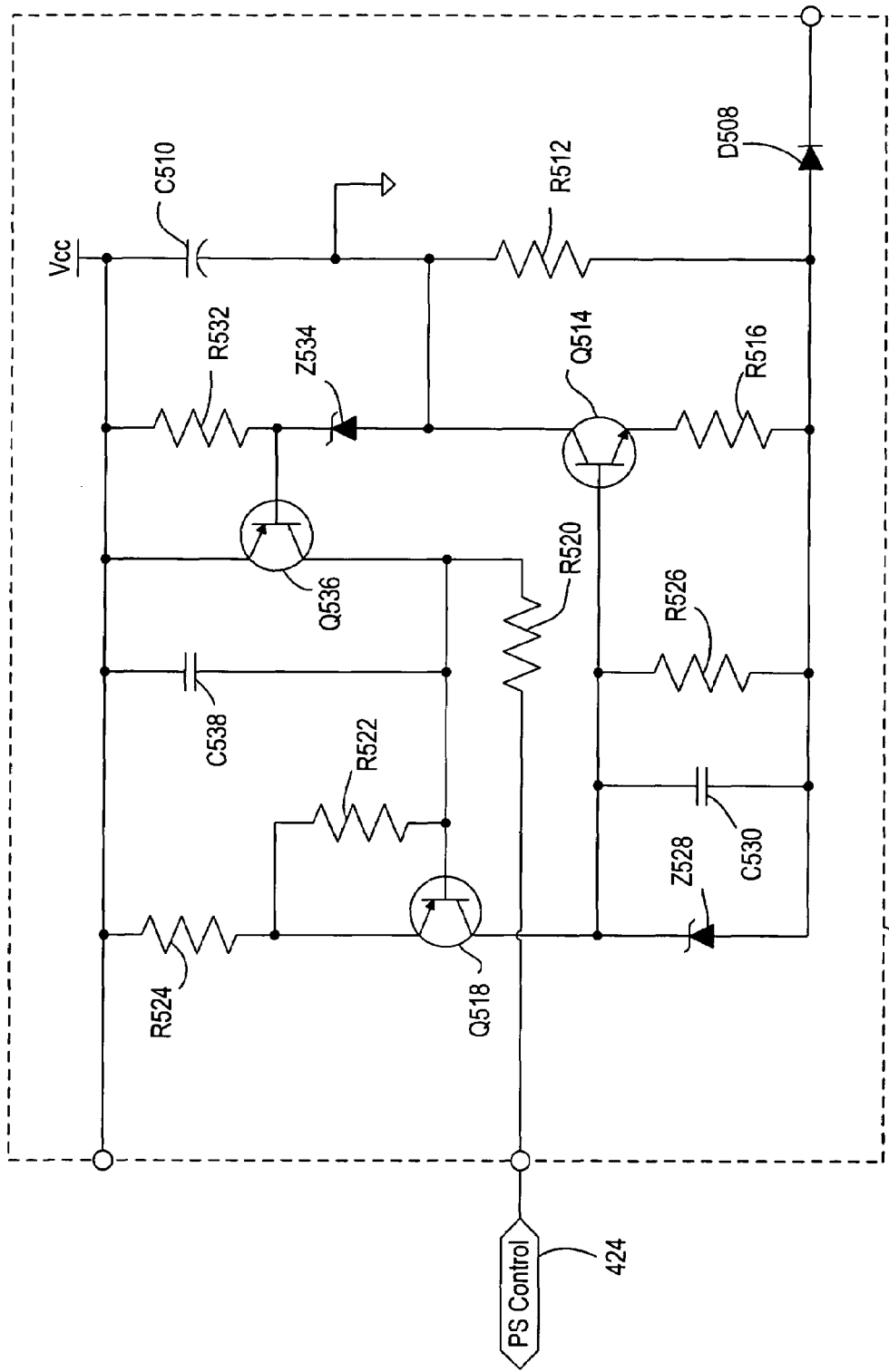
FIG. 5B is a simplified schematic diagram of a cat-ear power supply including a half-wave rectifier bridge according to the present invention.

Alternatively, the cat-ear power supply 422 could include a half-wave bridge rectifier, for example, comprising only diode D508, i.e., the diodes D502, D504, D506 would not be provided, as shown in FIG. 5B. The half-wave rectifier bridge comprising only one diode D508 would allow the cat-ear power supply 422 to charge in only the positive or the negative half-cycles and thus only once per line cycle.

The cat-ear power supply 422 includes a passive charging or energy-receiving circuit comprising a "boot-strap" resistor R512. The resistor R512 allows the energy storage capacitor C510 to begin charging before the microprocessor 414 is powered up and running, such that the energy storage capacitor C510 is only charged by the current flowing through the resistor R512 and the impedance of the lighting load 408. The resistor R512 preferably has a resistance of 15 kΩ, which is suitably low enough to ensure sufficient current is available to bring the microcontroller out of the internal low-voltage reset mode. The current through the resistor R512 provides sufficient charge on the energy storage capacitor C510 to bring the microprocessor 414 out of an internal low-voltage reset mode (e.g., when voltage supply input to the microprocessor rises above approximately 3.75V). During the time when the energy storage capacitor C510 is charging through the boot-strap resistor R512, the majority of the current drawn from the power supply 422 (i.e., drawn by the microprocessor 414 and the other low-voltage circuitry) is minimal since the microprocessor is unpowered or in reset mode. The energy storage capacitor C510 charges through the boot-strap resistor R512 until the microprocessor 414 is running and able to control the power supply 422. The boot-strap resistor R512 is also sized to be suitably large enough in impedance so that during normal operation, the power dissipation of the resistor is minimized.

Once powered, the microprocessor 414 can enable an active charging or energy-receiving circuit for the energy storage capacitor C510 through an NPN transistor Q514 (e.g., part number MJD47T4 manufactured by On Semiconductor) and a resistor R516. The resistor R516 has a low resistance (preferably 12Ω), which provides a charging current through the energy storage capacitor C510 of a much greater magnitude than the charging current through the passive charging circuit comprising the resistor R512, thus allowing the energy storage capacitor C510 to charge at a greater rate, i.e., with a smaller time constant. The microprocessor 414 is coupled to the base of a PNP transistor Q518 (e.g., part number MMBTA92 manufactured by On Semiconductor) through a resistor R520 (preferably having a resistance of 4.7 kΩ). When the energy storage capacitor C510 is charging through the resistor R512 during start up, the port 424 of the microprocessor 414 that is connected to the resistor R520 is maintained as a high impedance and the transistor Q514 is non-conductive.

Upon coming out of reset mode, the microprocessor 414 measures the frequency of, and synchronizes to, the AC voltage supply 404 by means of the zero-crossing detect circuit 420 and the internal clock of the microprocessor. After synchronizing with the AC voltage supply 404, the microprocessor 414 can enable the active charging circuit by pulling the port 424 low and thereby pulling down the base of the transistor Q518. Thus, a voltage is produced across a resistor R522 and the emitter-base junction of the transistor Q518 allowing current flow through the transistor Q518 and an emitter resistor R524. The resistors R522, R524 preferably have resistances of 10 kΩ and 510Ω, respectively. The current flow through the transistor Q518 produces a voltage across a resistor R526 coupled across the base-emitter junction of the transistor Q514 and provides base current for the transistor Q514. This enables the active charging circuit of the energy storage capacitor C510, allowing the charging current for the energy storage capacitor C510 to flow through the transistor Q514 and the resistor R516. The current through the transistor Q514 is limited by the resistor R516 and a zener diode Z528 (preferably having a break-over voltage of 3.3V, e.g., part number MMSZ4684ET1 manufactured by On Semiconductor). A capacitor C530 is coupled across the resistor R526 and provides some time delay in the enabling of the active charging circuit. Preferably, the resistor R526 has a resistance of 10 kΩ and the capacitor C530 has a capacitance of 0.33 µF.

The power supply 422 further includes a hardware shut-off circuit having a PNP transistor Q536, a resistor R532, and a zener diode Z534. The resistor R532 (preferably having a resistance of 1 kΩ) and the zener diode Z534 are coupled in series across the energy storage capacitor C510, with the anode of the zener diode connected to circuit common. The PNP transistor Q536 (e.g., part number MBT3906DW1T1 manufactured by On Semiconductor) is coupled between the DC voltage $V_{CC}$ and the base of the transistor Q518. The base of the transistor Q536 is connected to the junction of the resistor R532 and the zener diode Z534. The zener diode Z534 preferably has a break-over voltage of 4.7V (e.g., part number MMSZ4688ET1 manufactured by On Semiconductor), such that when the voltage across the energy storage capacitor C510 reaches approximately 5.2V (i.e., the DC voltage $V_{CC}$ is at an appropriate level), current will flow through the zener diode Z534 and the resistor R532, producing a voltage across the resistor. Thus, the transistor Q536 will begin to conduct, pulling the base of the transistor Q518 up to the DC voltage $V_{CC}$. This overrides the control signal from the port 424 of the microprocessor 414 and disables the active charging circuit through the transistor Q514 and the resistor R516.

The microprocessor 414 is operable to monitor the voltage at the base of the transistor Q518 to determine if the energy storage capacitor C510 has fully charged. By briefly changing the port 424 from being configured as an output to being configured as an input, the microprocessor 414 can periodically check to see if the base of the transistor Q518 is being pulled up to the DC voltage $V_{CC}$ by the transistor Q536. A capacitor C538 is provided from the DC voltage $V_{CC}$ to the base of the transistor Q518 and preferably has a capacitance of 0.01 µF. During the times that the port 424 has been changed to an input to monitor the power supply 422, the capacitor C538 holds the voltage at the base of the transistor Q518 at a level appropriate to keep the transistor Q518 in the conductive state if the charging of the energy storage capacitor C510 has not yet finished.

Figure 2:
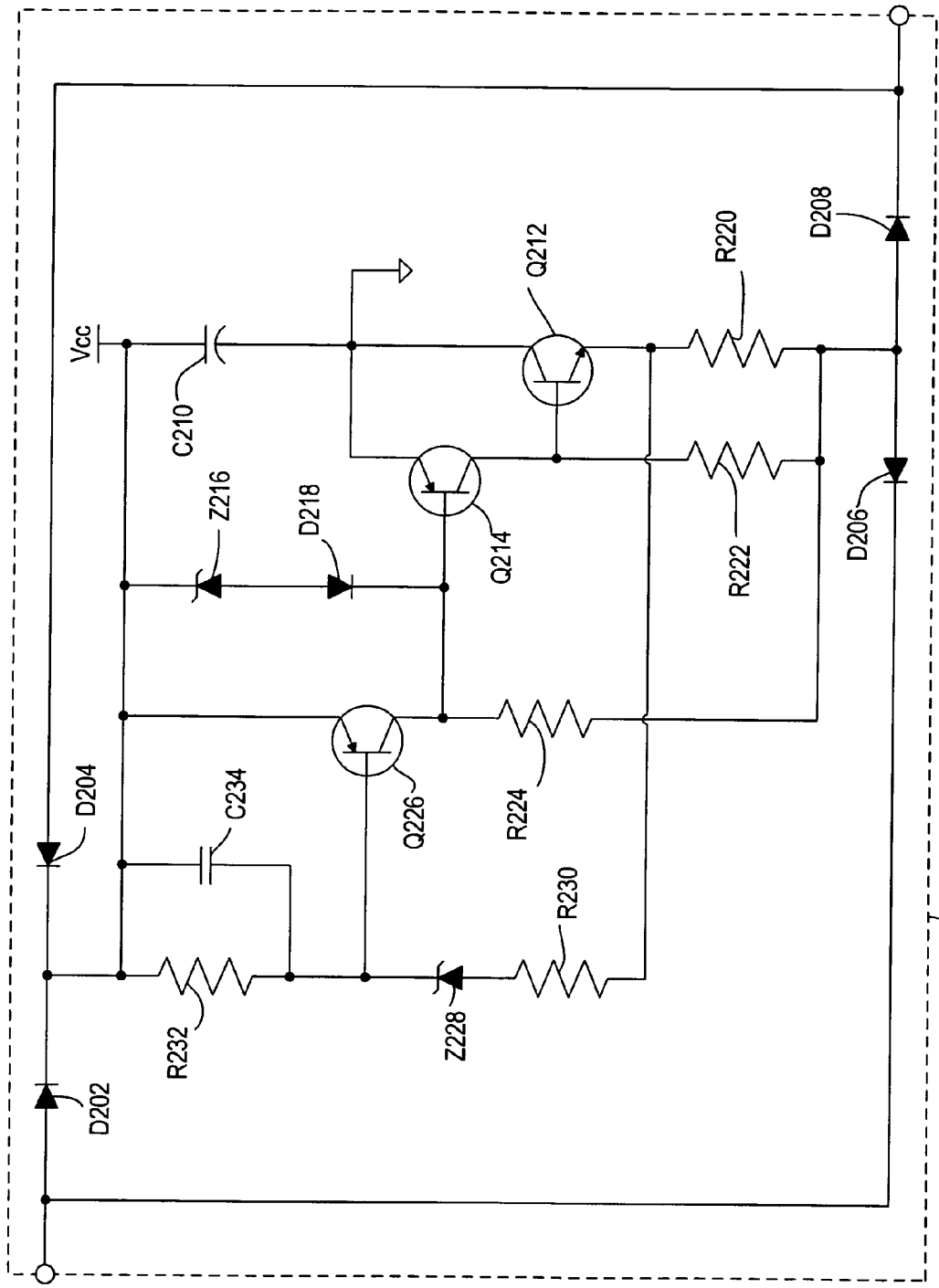
FIG. 2 is a simplified schematic diagram of a cat-ear power supply of the dimmer of FIG. 1.
Figure 3:
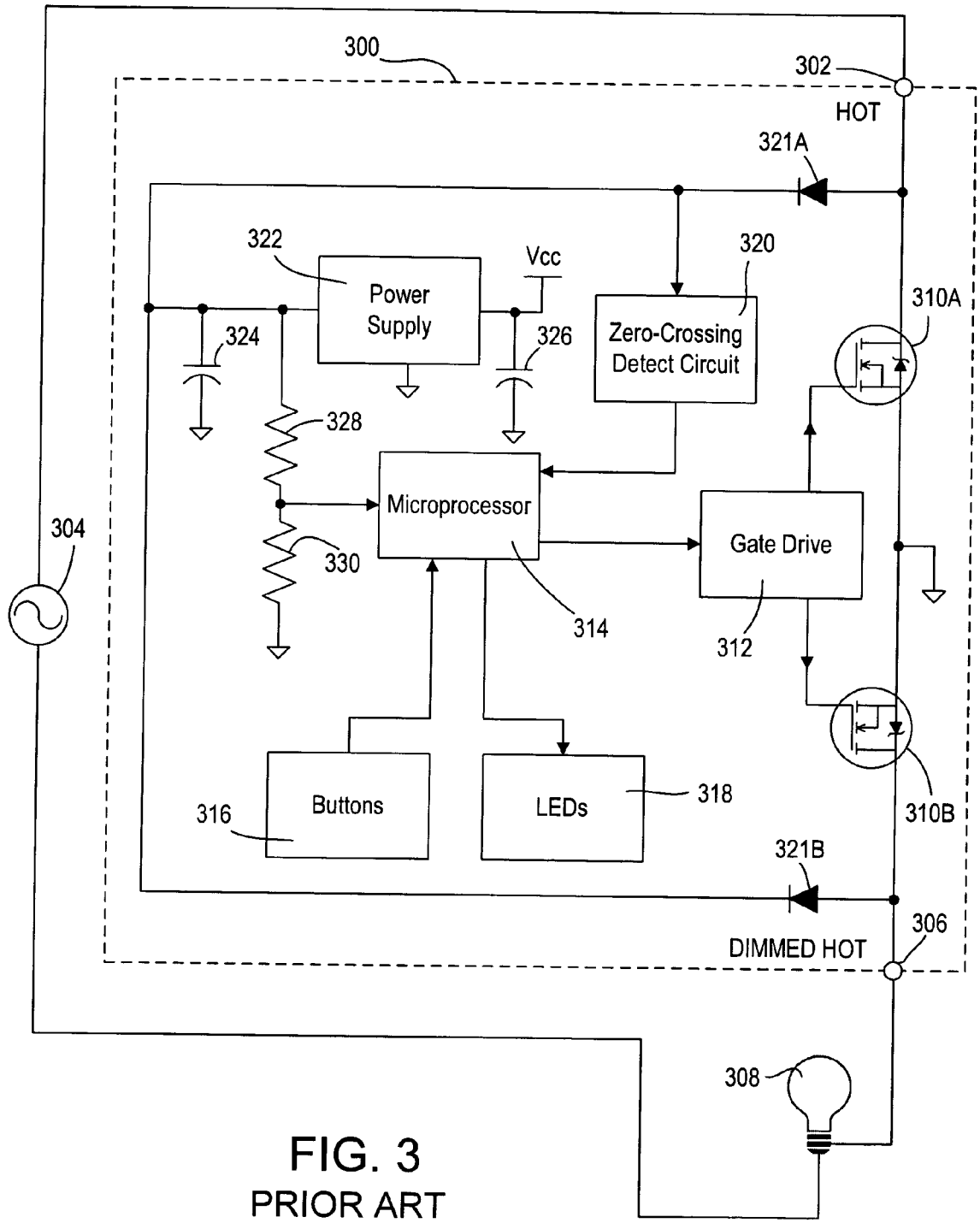
FIG. 3 is a simplified block diagram of another prior art two-wire dimmer.

The microprocessor 414 is adapted to control the time period when the active charging circuit through the transistor Q514 is enabled each half-cycle of the AC voltage source 404. In order to limit this charging time to the beginning portion of each half-cycle, the microprocessor 414 only enables the active charging circuit at a predetermined time after a zero-crossing has been detected by the zero-crossing detect circuit 420. In this way, the active charging circuit is never enabled when the AC voltage is at its peak value. Accordingly, the transistor Q514 and the resistor R516 are never operated outside of their safe operating area, and do not need to be large, expensive parts as were required in the prior art cat-ear power supply 122 of FIG. 2.

In response to the time that is required to charge the power supply 422, the microprocessor 414 is operable to change the dimming range of the dimmer. By default, the dimmer 400 begins operating with a normal dimming range that has been determined by considering worst-case line conditions and load conditions. For example, the worst-case load condition for the power supply 422 assumes a 40 W lamp as the lighting load. The microprocessor 414 can change the dimming range of dimmer 400 to a maximum dimming range to provide a greater high-end intensity of the attached lighting load than the normal dimming range. The microprocessor 414 can also change the dimming range back to the normal dimming range in response to operating conditions.

The microprocessor 414 preferably includes a timer such that the microprocessor is able to record the time required to charge the power supply 422 each half-cycle. The microprocessor records the time from when the active charging circuit is enabled to when the port 424 is pulled high by the transistor Q536 of the hardware shut-off circuit. If this time is below a predetermined threshold for a number of consecutive half-cycles, it is assumed that the energy storage capacitor C510 is easily able to charge each half-cycle and the microprocessor 414 is programmed to increase the dimming range of the dimmer 400 to the maximum dimming range, such that the high-end has a greater intensity. Since the average current draw of the power supply 422 is greatly dependent on the impedance of the connected lighting load, the dimmer 400 will generally tend to continue operating with either the normal dimming range or the maximum dimming range, without changing between the ranges, until the connected lighting load is changed to a different wattage. Since the load impedance changes as the dimmer 400 changes the intensity of the lighting load 408 (i.e., as the light level is increased, the impedance of the lighting load will increase), the microprocessor 414 preferably monitors the time required to charge the energy storage capacitor C510 at or near high-end since this is when the power supply 422 will draw the worst-case charging current.

The microprocessor 414 is also capable of disabling the active charging circuit by pulling the port 424 high before the hardware shut-off circuit disables the active charging circuit. If a predetermined time elapses (from when the active charging circuit is enabled) before the transistor Q536 shuts off the active charging circuit, the microprocessor 414 will preferably override the hardware shut-off circuit to protect the transistor Q514 and the resistor R516 from potential damage, i.e., as the voltage across the dimmer increases, the current through, and the power dissipation of, the transistor Q514 and the resistor R516 will increase. The predetermined time preferably corresponds to a time after which the voltage across the dimmer is great enough to pose a potential hazard to the susceptible parts of the power supply 422, i.e., the transistor Q514 and the resistor R516. The energy storage capacitor C510 can potentially require greater amounts of time to charge: (1) during startup of the power supply 422; (2) if the power requirements of the microprocessor 414 and other low-voltage circuitry are greater than normal; or (3) if the energy storage capacitor is not able to charge during a certain half-cycle.

The microprocessor 414 is also able to control the loads of the power supply 422, i.e., the gate drive circuit 412, the LEDs 418, and the communication circuit 426. If the microprocessor 414 detects that the energy storage capacitor C510 does not have enough time to charge during each half-cycle, the microprocessor 414 can optionally cause some of the loads of the power supply to draw less current by, for example, turning off or dimming the LEDs 418, turning off the semiconductor switch 410, or placing the communication circuit 426 in an idle mode. Also, during the startup of the power supply 422, the microprocessor 414 does not enable the loads of the power supply until after a predetermined number of half-cycles to allow the DC voltage $V_{CC}$ provided by the energy storage capacitor C510 achieve a stable value.

Figure 5C:
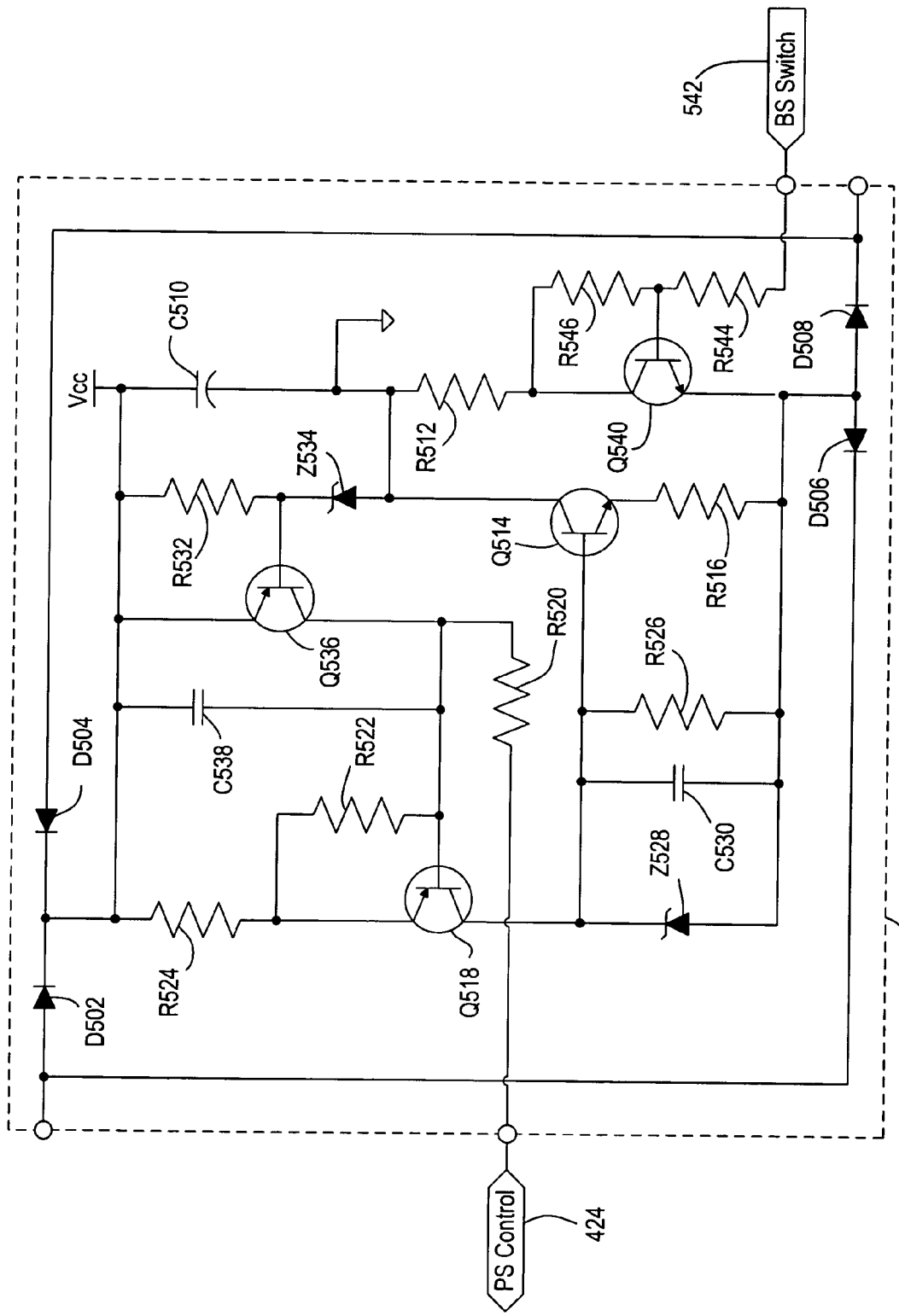
FIG. 5C is a simplified schematic diagram of a cat-ear power supply including a transistor in series with a boot-strap resistor according to the present invention.

The power supply 422 may also include an additional semiconductor switch, for example, a NPN transistor Q540 (as shown in FIG. 5C), for selectively switching the boot-strap resistor R512 out of the circuit after startup of the power supply, i.e., when the boot-strap resistor is no longer needed. The base of the transistor Q540 is coupled to an output port 542 of the microprocessor 414 through a resistor R544. Accordingly, the microprocessor 414 is operable to render the transistor Q540 non-conductive to disable the passive energy-receiving circuit comprising the boot-strap resistor R512. The base of the transistor Q540 is also coupled to a resistor R546. Before the microprocessor 414 is powered, a current flows through the resistor R546 into the base of the transistor Q540, such that the transistor Q540 allows the energy storage capacitor C510 to charge through the boot-strap resistor R512.

Figure 6A:
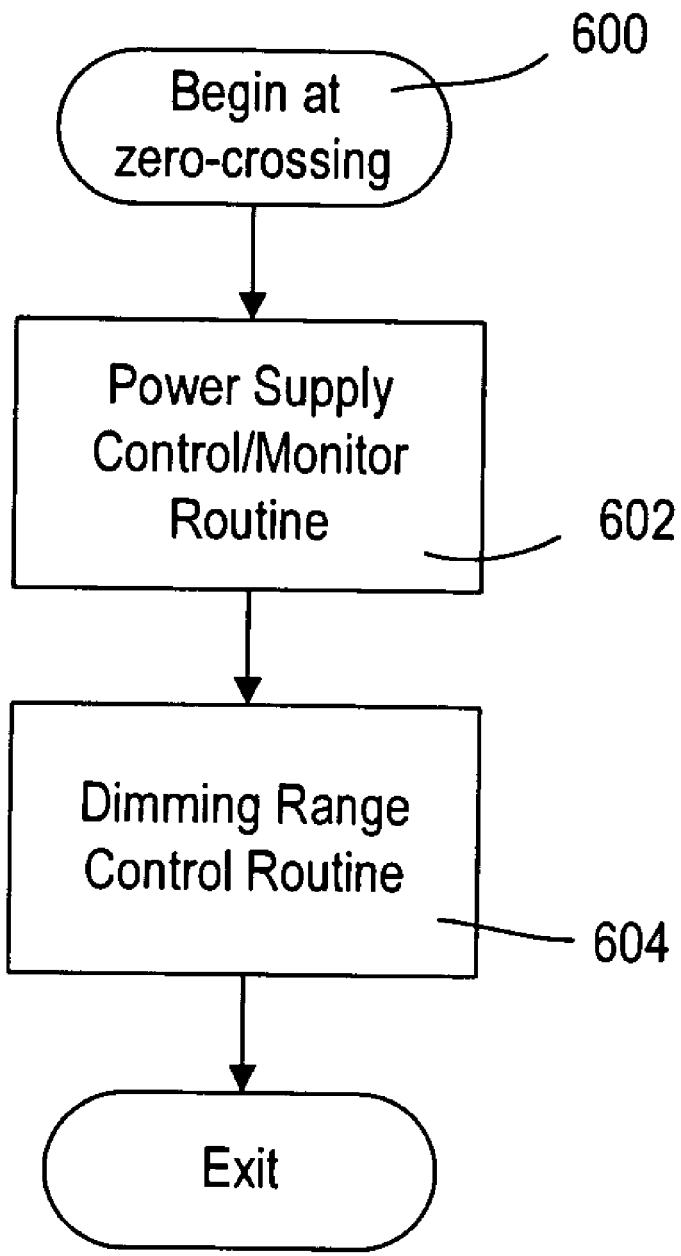
FIG. 6A shows a flowchart of the normal operation process of a microprocessor of the dimmer of FIG. 4.

FIG. 6A shows a flowchart of the normal operation process of the microprocessor 414 for controlling the power supply 422 of the dimmer 400. This process is performed each half-cycle. The process begins each half-cycle at a zero-crossing of the AC voltage at step 600, and then executes in sequence a power supply control/monitor routine 602 and a dimming range control routine 604.

Figure 6B:
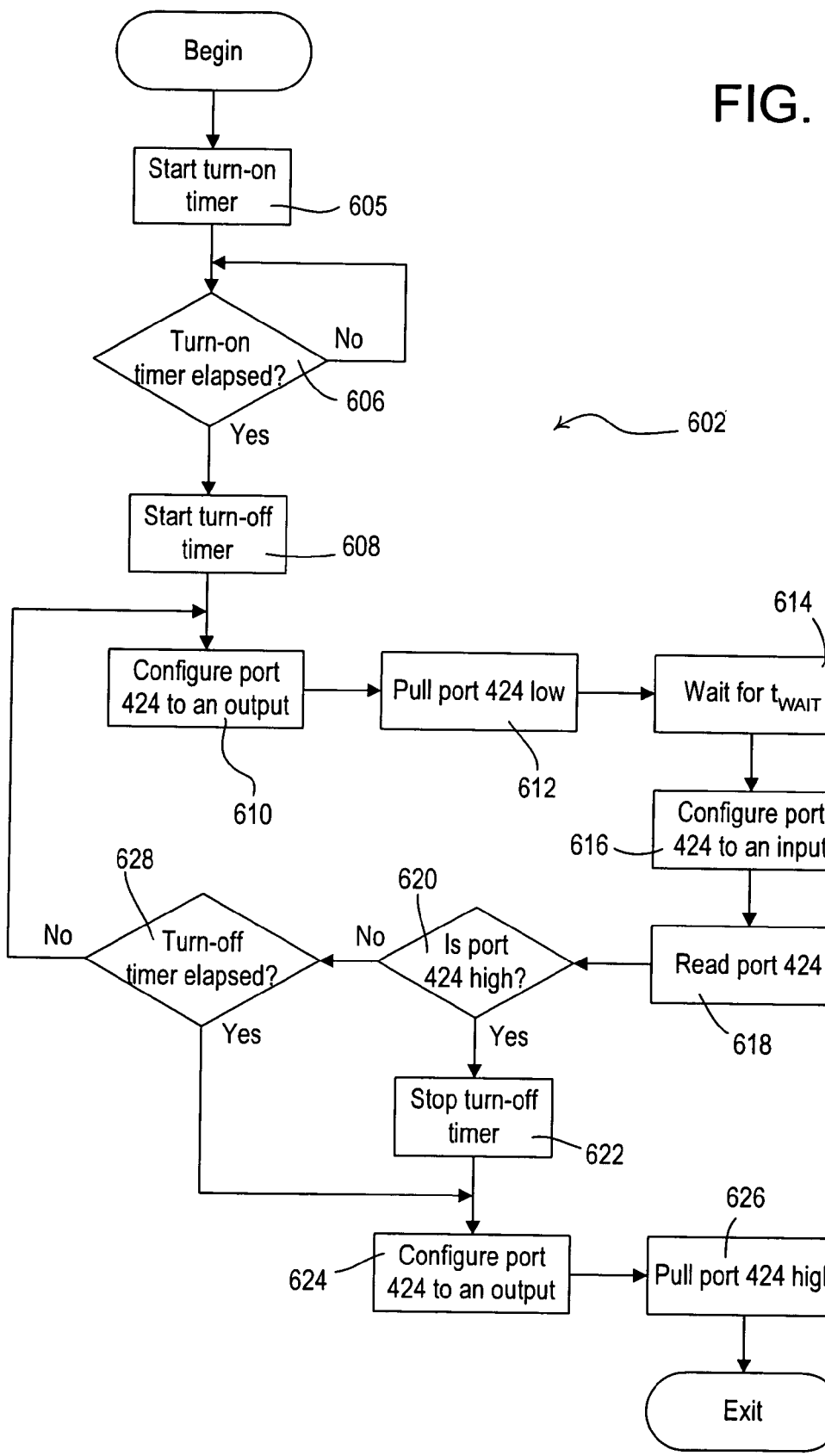
FIG. 6B shows a flowchart of a power supply control/monitor routine of the process of FIG. 6A.

FIG. 6B shows a flowchart of the power supply control/monitor routine 602 in greater detail. At step 605, a "turn-on" timer is initialized, for example, to 150 μsec, and is started in a decrementing operation. The turn-on timer determines the time between a zero-crossing and when the active charging circuit is enabled. If the turn-on timer has not elapsed (i.e., has not decreased to zero) at step 606, the process loops until the turn-on timer has elapsed, at which time a "turn-off" timer is started at step 608 and decreases in value with respect to time. The turn-off timer is initialized, for example, to 400 μsec, and is used to override the hardware shut-off circuit comprising transistor Q536 if the energy storage capacitor C510 does not charge fully before the turn-off timer elapses (i.e., decreases to zero).

At step 610, port 424 of the microprocessor 414 is configured as an output, and then, the port 424 is pulled low at step 612, thus enabling the active charging circuit and causing the energy storage capacitor C510 to begin charging (i.e., storing energy) at a greater rate, i.e., with a smaller time constant. Next, the microprocessor waits for a time $t_{WAIT}$ (which is preferably 100 μsec to 200 μsec) at step 614. Now, the microprocessor 414 checks the voltage at the port 424 by first configuring the port as an input at step 616 and then reading the port at step 618. The voltage at the port 424 will either be low (i.e., at or about zero volts) if the energy storage capacitor C510 has not finished charging, or high (i.e., at or about $V_{CC}$) if the energy storage capacitor C510 is sufficiently charged and the transistor Q536 is conducting. Since the microprocessor 414 can only cease driving the port 424 for short, infrequent periods of time to prevent disabling the active charging circuit, the wait operation at step 614 allows the microprocessor 414 to periodically monitor the voltage at port 424 at an appropriate interval of time.

At step 620, if the port 424 is high, then the turn-off timer is stopped at step 622, the port 424 is configured as an output at step 624, and the port is pulled high at step 626. The process then exits. If at step 620 the port 424 is still low, a determination is made at step 628 as to whether the turn-off time has expired. If not, the process loops around to enable the active charging circuit and then to monitor the port 424 again. If the turn-off timer has expired at step 628, the active charging circuit is enabled at steps 624 and 626 and then the process exits.

Figure 6C:
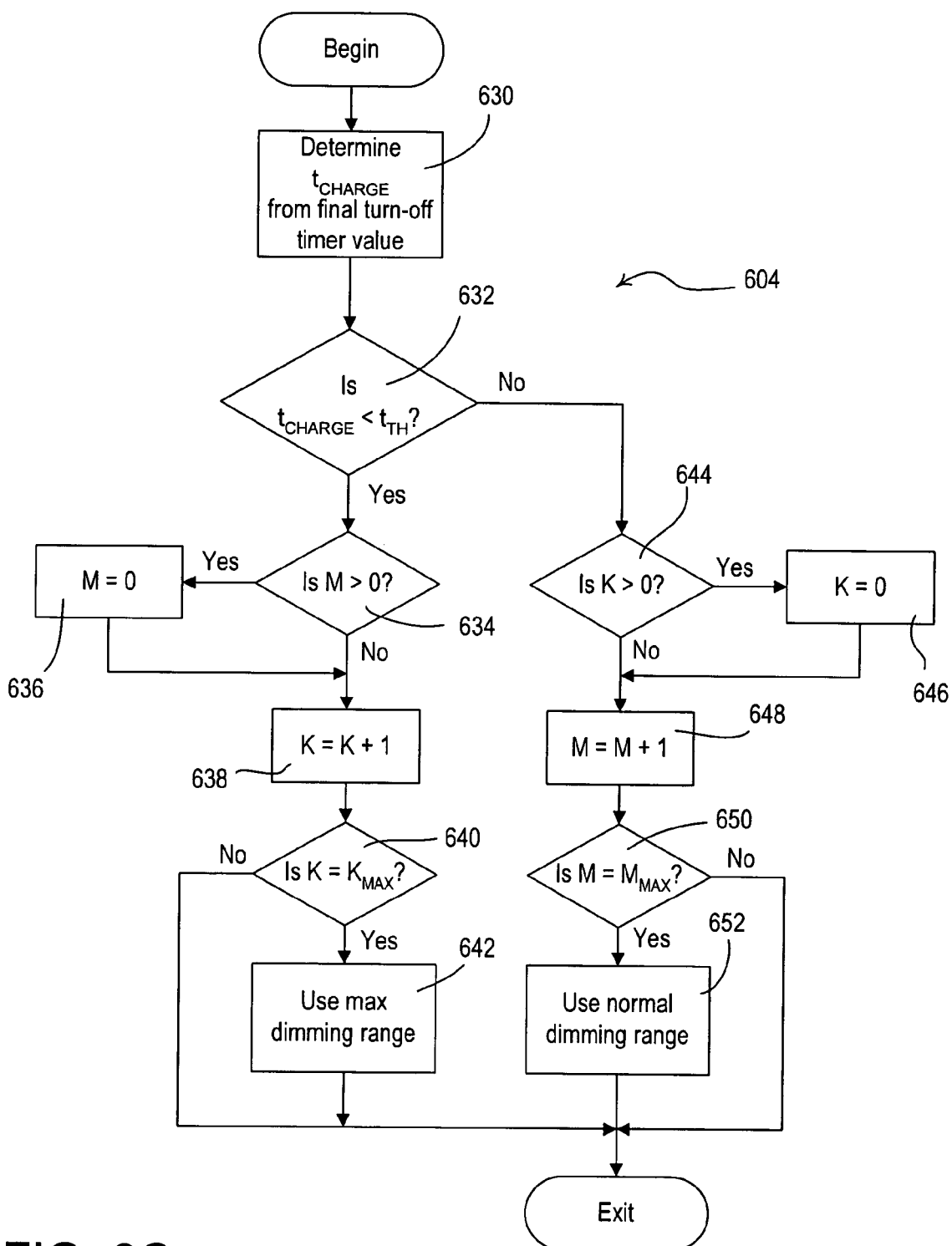
FIG. 6C shows a flowchart of a dimming range control routine of the process of FIG. 6A.

FIG. 6C shows a flowchart of the dimming range control routine 604 in greater detail. At step 630, a charging time, $t_{CHARGE}$, of the power supply 422 for the present half-cycle is determined from the final value of the turn-off timer. For example, if the original value of the turn-off timer is 400 μsec and the final value of the turn-off timer is 150 μsec, the charging time $t_{CHARGE}$ is 250 μsec. If at step 632, the charging time $t_{CHARGE}$ is less than a threshold, $t_{TH}$, then the microprocessor 414 attempts to change the dimmer 400 to the maximum dimming range. If the charging time $t_{CHARGE}$ is above the threshold $t_{TH}$ at step 632, the microprocessor 414 will attempt to change the dimmer 400 to the normal dimming range. A variable K and a variable M are used to count the number of consecutive half-cycles that the charging time $t_{CHARGE}$ is below the threshold $t_{TH}$, or above the threshold $t_{TH}$, respectively. Note that the variables K and M are preferably initialized to zero. The variables K and M are incremented until the variables reach maximum values, $K_{MAX}$ and $M_{MAX}$, respectively. Preferably, the maximum values $K_{MAX}$ and $M_{MAX}$ are both 3.

At step 634, if the variable M is greater than zero (i.e., the charging time $t_{CHARGE}$ was above the threshold $t_{TH}$ during the previous half-cycle), then the variable M is reset to zero (i.e., M equals zero) at step 636 and the variable K is incremented by one at step 638. If the variable M is not greater than zero at step 634, the process simply moves to step 638. If the variable K is equal to $K_{MAX}$ at step 640, the charging time $t_{CHARGE}$ has been above the threshold $t_{TH}$ for the appropriate number of consecutive times and the dimming range is accordingly changed to the maximum dimming range at step 642. However, if the variable K is not equal to $K_{MAX}$ at step 640, the dimming range is not changed and the process exits.

If the charging time $t_{CHARGE}$ is above the threshold $t_{TH}$ at step 632, the microprocessor 414 uses a similar process in steps 644, 646, 648, 650 to determine if the dimmer 400 should change to the normal dimming range at step 652.

Figure 7:
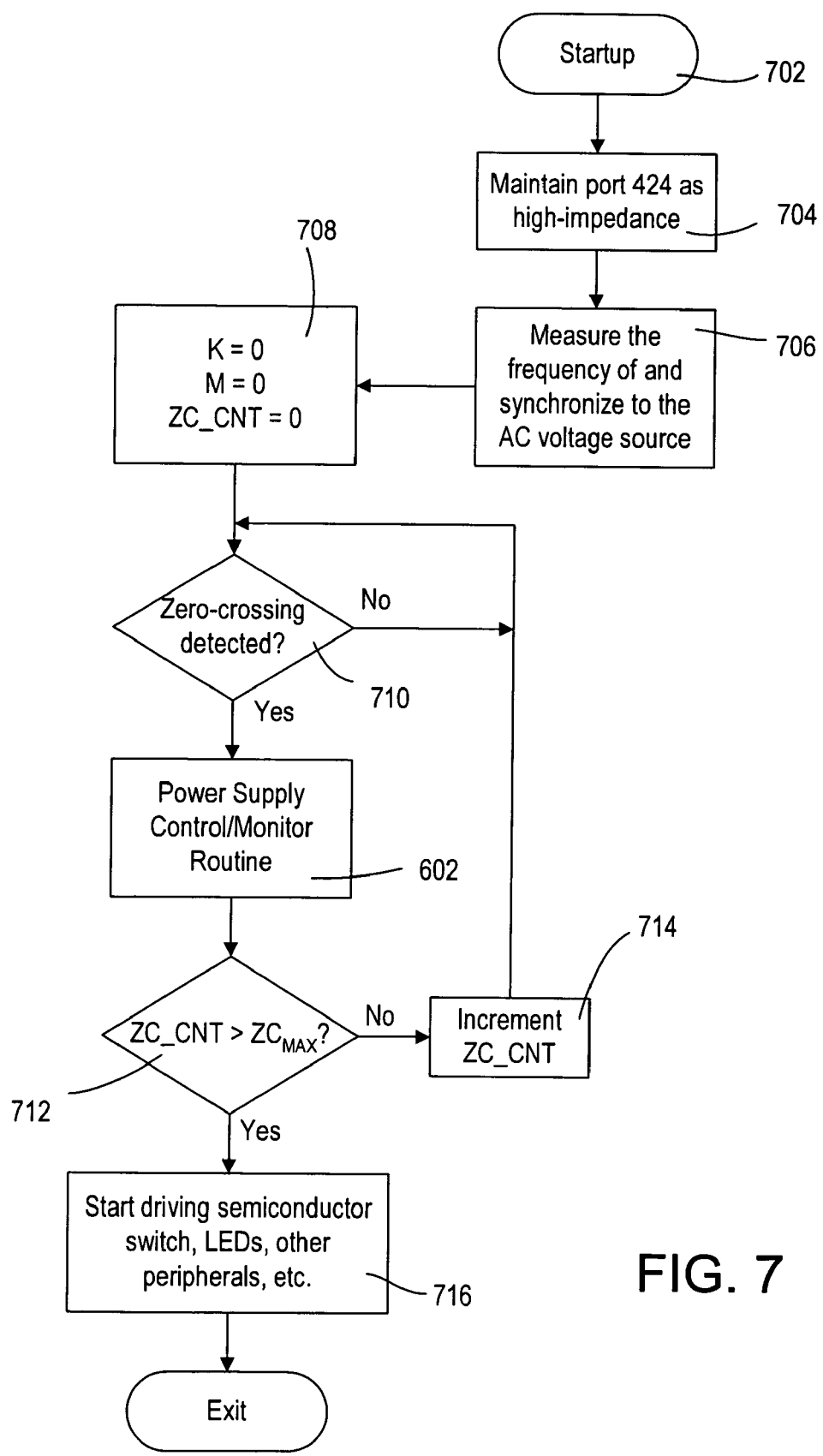
FIG. 7 shows a flowchart of the startup routine of the microprocessor of the dimmer of FIG. 4.

FIG. 7 shows a flowchart of the startup routine of the microprocessor 414. The process begins when the microprocessor comes out of reset mode at step 702. At step 704, the microprocessor 414 maintains the port 424 at high impedance to keep the active charging circuit through transistor Q514 disabled. The microprocessor 414 measures the frequency of the AC source voltage and synchronizes to this frequency at step 706. At step 708, the variables K and M (that are used in the dimming range control routine 604) and a variable ZC_CNT are initialized to zero. The variable ZC_CNT is used by the startup routine to count the zero-crossings of the AC voltage supply 404 after startup.

Next, the microprocessor 414 executes the power supply control/monitor routine 602 (as shown in FIG. 6B) for a number, $ZC_{MAX}$, of consecutive half-cycles to allow the power supply 422 to regulate the voltage across the energy storage capacitor C510 to a specified level. At step 710, the process waits until a zero-crossing is detected, and then the power supply control/monitor routine 602 is executed. At step 712, if the variable ZC_CNT is less than or equal to the number $ZC_{MAX}$, then the variable ZC_CNT is incremented by one at step 714 and the process loops to wait for the next zero-crossing at step 710. If the variable ZC_CNT is greater than the number $ZC_{MAX}$ at step 656, the microprocessor 414 then begins driving the semiconductor switch 410 to provide power to the lighting load 408, turns on the LEDs 418, and begins communicating via the communication circuit 426 at step 716. Next, the startup routine exits.

While the present invention has been primarily discussed operating in a closed loop mode in which the microprocessor 414 is able to monitor the power supply 422, the microprocessor may also operate in an open loop mode. The microprocessor 414 could simply turn on (i.e., enable) the active charging circuit each half-cycle and allow the hardware shut-off circuit to turn off (i.e., disable) the active charging circuit. Alternatively, the microprocessor 414 could turn off the active charging circuit of the power supply 422 at a predetermined time after the active charging circuit is turned on, rather than monitoring the power supply in order to turn off the active charging circuit.

Although the word "device" has been used to describe the load control device of the present invention and the elements of the load control device, it should be noted that each "device" described herein need not be fully contained in a single enclosure or structure. For example, the dimmer 400 may comprise a plurality of buttons in a wall-mounted enclosure and a processor that is included in a separate location. Also, one "device" may be contained in another "device".

Additionally, the circuit diagrams shown in the figures and described in the text are an example of the invention and are not the only implementations possible. As appreciated by a person of ordinary skill in the art, component, software, and circuit substitutions and alterations may be made to the present invention without limitation except as identified by the appended claims.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A two-wire load control device for control of power delivered to an electrical load from a source of AC voltage, comprising:
a first controllably conductive device adapted to be operatively coupled to the source of AC voltage and to the electrical load for controlling the power delivered to the load;
a microprocessor coupled to the first controllably conductive device for controlling the first controllably conductive device; and
a power supply adapted to be coupled to the source of AC voltage and coupled to the microprocessor for generating a DC voltage to power the microprocessor, the power supply including an energy storage element and a second controllably conductive device for controllably storing energy in the energy storage element;
wherein the microprocessor is operatively coupled to the second controllably conductive device to control the second controllably conductive device,
further wherein the power supply further comprises a low impedance circuit in series electrical connection with the second controllably conductive device and a high impedance circuit in parallel electrical connection with the series combination of the low impedance circuit and the second controllably conductive device;
wherein when the second controllably conductive device is non-conductive, the energy storage element is operable to receive energy through the high impedance circuit, and when the second controllably conductive device is conductive, the energy storage element is operable to receive energy through the low impedance circuit.

2. The load control device of claim 1, wherein the microprocessor monitors the power supply in order to determine whether the energy storage element is receiving energy through the low impedance circuit.

3. The load control device of claim 2, wherein the power supply further comprises a hardware shut-off circuit for causing the second controllably conductive device to become non-conductive when the DC voltage exceeds a predetermined threshold.

4. The load control device of claim 3, wherein the microprocessor controls the second controllably conductive device to become conductive at a predetermined time after a zero-crossing of the AC voltage.

5. The load control device of claim 3, wherein the microprocessor controls the second controllably conductive device to become non-conductive before the DC voltage exceeds the predetermined threshold.

6. The load control device of claim 2, wherein the microprocessor is operable to control the first controllably conductive device in order to control the power delivered to the electrical load in response to monitoring the power supply.

7. The load control device of claim 2, further comprising:
a low-voltage load powered by the DC voltage of the power supply and operable to draw a current from the energy storage element of the power supply;
wherein the microprocessor is operable to control the first controllably conductive device in order to control the power delivered to the electrical load in response to the current drawn by the low-voltage load.

8. The load control device of claim 2, further comprising:
a low-voltage load powered by the DC voltage of the power supply and operable to draw a current from the energy storage element of the power supply;
wherein the microprocessor is operable to control the amount of current drawn by the low-voltage load in response to monitoring the power supply.

9. The load control device of claim 1, wherein the microprocessor controls the second controllably conductive device to become conductive at a predetermined time after a zero-crossing of the AC voltage.

10. The load control device of claim 1, wherein the microprocessor controls the second controllably conductive device to become non-conductive at a predetermined time after a zero-crossing of the AC voltage.

11. The load control device of claim 1, wherein the power supply further comprises a hardware shut-off circuit for causing the second controllably conductive device to become non-conductive when the DC voltage exceeds a predetermined threshold.

12. The load control device of claim 1, further comprising:
a low-voltage load powered by the DC voltage of the power supply and operable to draw a current from the energy storage element of the power supply;
wherein the microprocessor is operable to control the amount of current drawn by the low-voltage load to substantially zero amps for a predetermined number of half-cycles of the AC voltage after a startup of the microprocessor.

13. The load control device of claim 1, wherein the power supply further comprises a third controllably conductive device in series electrical connection with the high impedance circuit, the microprocessor operable to control the third controllably conductive device.

14. A two-wire load control device for control of a load from a source of AC voltage, comprising:
a first controllably conductive device adapted to be coupled in series electrical connection between the load and the source of AC voltage;

a power supply comprising a controllable impedance coupled in series electrical connection with an energy storage element, the power supply operable to provide a DC voltage to the energy storage element, the energy storage element operable to receive energy when the first controllably conductive device is non-conductive; and a controller powered by the DC voltage of the power supply and coupled to the first controllably conductive device and the controllable impedance for control of the first controllably conductive device and the controllable impedance, respectively;

wherein the controller is operable to control the controllable impedance to a first impedance value to cause the energy storage element to receive energy at a first rate and to control the controllable impedance to a second impedance value to cause the energy storage element to receive energy at a second rate, wherein the second impedance value is substantially smaller than the first impedance value.

15. The load control device of claim 14, wherein the controllable impedance comprises a first resistor in series electrical connection with a second controllably conductive device, wherein the controller is operable to control the second controllably conductive device.

16. The load control device of claim 15, wherein the controllable impedance comprises a second resistor in parallel electrical connection with the series combination of the second controllably conductive device and the first resistor.

17. The power supply of claim 14, wherein the second energy-receiving circuit comprises a first controllably conductive device having a control input, the energy storage element operable to receive energy at the second rate when the first controllably conductive device is conductive;

wherein the controller is operable to render the controllably conductive device conductive and non-conductive.

18. The power supply of claim 17, further comprising:
a hardware shut-off circuit operable to render the first controllably conductive device non-conductive when the DC voltage exceeds a predetermined threshold.

19. The power supply of claim 18, further comprising:
a second controllably conductive device switch having a control input and coupled between the DC voltage and the control input of the first controllably conductive device;

wherein the first controllably conductive device is rendered conductive when the second controllably conductive device is conductive.

20. The power supply of claim 19, wherein the hardware shut-off circuit comprises:
a third controllably conductive device having a control input and coupled between the DC voltage and the control input of the second controllably conductive device;

a resistor coupled to the DC voltage and the control input of the third controllably conductive device; and a zener diode having a cathode coupled to the junction of the resistor and the control input of the third controllably conductive device; the series combination of the resistor and the zener diode connected in parallel electrical connection with the energy storage element;

wherein the third controllably conductive device is rendered conductive when the voltage across the zener diode exceeds the break-over voltage of the zener diode.

21. The power supply of claim 18, wherein the controller is operable to render the first controllably conductive device non-conductive before the DC voltage exceeds the predetermined threshold.

22. The power supply of claim 18, wherein the controller is coupled to the hardware shut-off circuit and is operable to determine if the hardware shut-off circuit is rendering the first controllably conductive device non-conductive.

23. The power supply of claim 17, wherein the second energy-receiving circuit comprises a first resistor in series electrical connection with the first controllably conductive device.

24. The power supply of claim 23, wherein the first energy-receiving circuit comprises a second resistor in parallel electrical connection with the series combination of the first controllably conductive device and the first resistor.

25. The power supply of claim 24, wherein the first energy-receiving circuit further comprises a second controllably conductive device in series electrical connection with the second resistor; the controller operable to render the second controllably conductive device conductive and non-conductive.

26. The power supply of claim 17, wherein the first controllably conductive device comprises a semiconductor switch.

27. The power supply of claim 26, wherein the semiconductor switch comprises a bipolar junction transistor.

28. A two-wire load control device for control of a load from a source of AC voltage, comprising:
a controllably conductive device adapted to be coupled in series electrical connection between the load and the source of AC voltage;

a power supply comprising an energy storage element, a first energy-receiving circuit for the energy storage element, and a second energy-receiving circuit for the energy storage element, the first energy-receiving circuit allowing the energy storage element to receive energy at a first rate, the second energy-receiving circuit allowing the energy storage element to receive energy at a second rate greater than the first rate, the power supply operable to store energy in the energy storage element when the controllably conductive device is non-conductive, the power supply producing a DC voltage; and a controller powered by the DC voltage of the power supply, the controller operable to control the controllably conductive device and coupled to the power supply to selectively enable and disable the second energy-receiving circuit.

29. A two-wire load control device for control of power delivered to an electrical load from a source of AC voltage, comprising:
a first controllably conductive device adapted to be operatively coupled to the source of AC voltage and to the electrical load for controlling the power delivered to the load;

a microprocessor coupled to the first controllably conductive device for controlling the first controllably conductive device; and a power supply adapted to be coupled to the source of AC voltage and coupled to the microprocessor for generating a DC voltage to power the microprocessor, the power supply comprising:
an energy storage element;
a second controllably conductive device operatively coupled to the microprocessor and operable to controllably store energy in the energy storage element in response to the microprocessor;
a low impedance circuit in series electrical connection with the second controllably conductive device; and
a high impedance circuit in parallel electrical connection with the series combination of the low impedance circuit and the second controllably conductive device;

wherein when the second controllably conductive device is non-conductive, the energy storage element is operable to receive energy through the high impedance circuit, and when the second controllably conductive device is conductive, the energy storage element is operable to receive energy through the low impedance circuit; and wherein the microprocessor monitors the power supply in order to determine whether the energy storage element is receiving energy through the low impedance circuit.

30. A power supply for a two-wire load control device for controlling a load from a source of AC voltage, the load control device having a controller, the load control device comprising:

an energy storage element operable to produce a DC voltage for powering the controller;

a first energy-receiving circuit for allowing the energy storage element to receive energy at a first rate; and a second energy-receiving circuit for allowing the energy storage element to receive energy at a second rate greater than the first rate;

wherein the controller is powered by the DC voltage and is operable to control the power supply to selectively enable and disable the second energy-receiving circuit.

31. A method for generating a DC voltage in a two-wire load control device for controlling the power delivered from an AC power source to an electrical load, the method comprising the steps of:

generating the DC voltage across an energy storage element;

providing the DC voltage to a controller of the load control device; and controlling with the controller of the load control device the time constant with which the energy storage element charges;

further wherein the step of controlling the time constant comprises selectively charging the energy storage element with a first time constant and with a second time constant greater than the first rate in response to the controller.

32. The method of claim 31, wherein the step of controlling the time constant further comprises charging the energy storage element with the second time constant after a second predetermined time after the zero-crossing of the AC voltage of the AC power source, the second predetermined time closer to the zero-crossing than the first predetermined time.

33. The method of claim 32, wherein the step of controlling the rate further comprises providing a hardware shut-off circuit coupled to the energy storage element for causing the energy storage element to stop charging with the second time constant.

34. The method of claim 33, further comprising the step of: monitoring the hardware shut-off circuit to determine whether the energy storage element has stopped charging with the second time constant.

35. The method of claim 34, wherein the step of controlling the time constant further comprises causing the energy storage element to stop charging with the second time constant before the hardware shut-off circuit causes the energy storage element to stop charging with the second time constant.

36. The method of claim 34, further comprising the step of: controlling the power delivered to the electrical load in response to the step of monitoring the hardware shut-off circuit.

37. The method of claim 34, further comprising the steps of:

providing a low-voltage load powered by the DC voltage and operable to draw a current from the energy storage element; and controlling the power delivered to the electrical load in response to the current drawn by the low-voltage load.

38. The method of claim 34, further comprising the steps of:

providing a low-voltage load powered by the DC voltage and operable to draw a current from the energy storage element; and controlling the amount of current drawn by the low-voltage load in response to step of monitoring the hardware shut-off circuit.

39. The method of claim 32, further comprising the steps of:

providing a low-voltage load powered by the DC voltage and operable to draw a current from the energy storage element; and controlling the amount of current drawn by the low-voltage load to substantially zero amps for a predetermined number of half-cycles of the AC voltage after a startup of the controller.

40. The method of claim 31, further comprising the step of: determining if the DC voltage has exceeded a predetermined voltage;

wherein the step of controlling the time constant further comprises charging the energy storage element with the second time constant when the DC voltage is below the predetermined voltage.

41. The method of claim 40, wherein the step of controlling the time constant further comprises charging the energy storage element with the second time constant before a first predetermined time after a zero-crossing of an AC voltage of the AC power source.

42. The method of claim 31, wherein the step of controlling the time constant further comprises charging the energy storage element at the first time constant before a startup of the controller.

43. The method of claim 42, further comprising the step of: determining if the DC voltage has exceeded a predetermined voltage;

wherein the step of controlling the time constant comprises selectively charging the energy storage element with a third time constant when the DC voltage is above the predetermined voltage, the third time constant equal to substantially large such that the energy storage element is prevented from charging.

44. A method for generating a DC voltage in a two-wire load control device, the method comprising the steps of:

generating the DC voltage across an energy storage element;

providing the DC voltage to a controller of the load control device;

selectively allowing the energy storage element to receive energy at a first rate and at a second rate greater than the first rate in response to the controller; and determining when the DC voltage exceeds a predetermined voltage;

wherein the step of controlling the rate further comprises allowing the energy storage element to receive energy at the second rate when the DC voltage is below the predetermined voltage.

* * * * *

UNITED STATES PATENT AND TRADEMARK OFFICE
CERTIFICATE OF CORRECTION

| | | |
|---|---|---|
| PATENT NO. | : 7,546,473 B2 | Page 1 of 1 |
| APPLICATION NO. | : 11/480146 | |
| DATED | : June 9, 2009 | |
| INVENTOR(S) | : Robert C. Newman, Jr. | |

It is certified that error appears in the above-identified patent and that said Letters Patent is hereby corrected as shown below:

On the title page, Item (75), change the Inventor to:

--Robert C. Newman, Jr., Emmaus, PA (US)--.

Signed and Sealed this

Fourth Day of August, 2009

JOHN DOLL
*Acting Director of the United States Patent and Trademark Office*